(12) United States Patent
Fujimoto et al.

(10) Patent No.: US 10,859,502 B2
(45) Date of Patent: Dec. 8, 2020

(54) METHOD AND TOOL FOR PRODUCING SAMPLE CONTAINING OBJECT, METHOD FOR PERFORMING GLOW DISCHARGE OPTICAL EMISSION SPECTROMETRY, AND GLOW DISCHARGE OPTICAL EMISSION SPECTROMETER

(71) Applicant: Horiba, Ltd., Kyoto (JP)

(72) Inventors: Akira Fujimoto, Kyoto (JP); Tatsuhito Nakamura, Kyoto (JP); Hiroko Yamada, Kyoto (JP)

(73) Assignee: HORIBA, LTD., Kyoto (JP)

( * ) Notice: Subject to any disclaimer, the term of this patent is extended or adjusted under 35 U.S.C. 154(b) by 302 days.

(21) Appl. No.: 15/919,760

(22) Filed: Mar. 13, 2018

(65) Prior Publication Data

US 2018/0266960 A1    Sep. 20, 2018

(30) Foreign Application Priority Data

Mar. 15, 2017  (JP) .................. 2017-050230

(51) Int. Cl.
*G01N 21/67* (2006.01)
*G01N 21/01* (2006.01)
*G01N 21/68* (2006.01)

(52) U.S. Cl.
CPC ............. *G01N 21/67* (2013.01); *G01N 21/01* (2013.01); *G01N 21/68* (2013.01)

(58) Field of Classification Search
CPC ........ G01N 21/67; G01N 21/01; G01N 21/73; G01N 21/714
See application file for complete search history.

(56) References Cited

U.S. PATENT DOCUMENTS 3,543,077 A   11/1970  Grimm
4,824,249 A    4/1989  Lucas et al.
(Continued)

FOREIGN PATENT DOCUMENTS

JP    S-551543 A     1/1980
JP    S-59217135 A  12/1984
(Continued)

OTHER PUBLICATIONS

Decision to Grant dated Sep. 8, 2020 for the corresponding Japanese Patent Application No. 2017-050230 (Japanese only).

*Primary Examiner* — Maurice C Smith
(74) *Attorney, Agent, or Firm* — Lucas & Mercanti, LLP

(57) ABSTRACT

A method, to perform glow discharge optical emission spectrometry using a glow discharge tube equipped with an electrode having an end section, for producing a sample containing object that is to be disposed so as to be opposed to the end section, comprises: covering one end of a sample holding section having a cylindrical shape and being open at both ends using a covering member; filling a powder sample containing a material to be analyzed into the sample holding section; compressing the powder sample by pressurizing the filled powder sample from the other end to the one end of the sample holding section; and removing the covering member from the sample holding section, thereby producing the sample containing object which includes the sample holding section and the compressed powder sample and from which the compressed powder sample is exposed from the one end.

12 Claims, 7 Drawing Sheets

(56) References Cited

U.S. PATENT DOCUMENTS

| | | | |
|---|---|---|---|
| 5,006,706 A | | 4/1991 | Marcus |
| 5,086,226 A | * | 2/1992 | Marcus ................. G01N 21/67 |
| | | | 250/281 |
| 5,675,410 A | | 10/1997 | Kanda |
| 7,242,471 B2 | * | 7/2007 | Hirano .................. G01N 21/67 |
| | | | 356/311 |
| 2006/0179975 A1 | | 8/2006 | Yamashina et al. |
| 2013/0248357 A1 | * | 9/2013 | Fujimoto ............ H01J 37/3053 |
| | | | 204/192.34 |

FOREIGN PATENT DOCUMENTS

| | | |
|---|---|---|
| JP | H-03214044 A | 9/1991 |
| JP | H-11101733 A | 4/1999 |
| JP | 2004347406 A | 12/2004 |
| JP | 4189290 B2 | 9/2008 |
| JP | 2013019034 A | 1/2013 |
| JP | 2015014553 A | 1/2015 |

* cited by examiner

METHOD AND TOOL FOR PRODUCING SAMPLE CONTAINING OBJECT, METHOD FOR PERFORMING GLOW DISCHARGE OPTICAL EMISSION SPECTROMETRY, AND GLOW DISCHARGE OPTICAL EMISSION SPECTROMETER

CROSS-REFERENCE TO RELATED APPLICATION

This non-provisional application claims priority under 35 U.S.C. § 119(a) on Patent Application No. 2017-050230 filed in Japan on Mar. 15, 2017, the entire contents of which are hereby incorporated by reference.

FIELD

The present invention relates to a method and tool for producing a sample containing object to be used for glow discharge optical emission spectrometry, a method for performing glow discharge optical emission spectrometry, and a glow discharge optical emission spectrometer.

BACKGROUND

Glow discharge optical emission spectrometry for performing component analysis using glow discharge has been carried out conventionally to analyze components contained in a sample. A glow discharge tube for generating glow discharge is equipped with an electrode having a cylindrical section, a sample to be analyzed is disposed so as to be opposed to the cylindrical section, an inert gas is supplied into the glow discharge tube, and a voltage is applied between the cylindrical section of the electrode and the sample, whereby glow discharge is generated. The surface of the sample is subjected to sputtering by the plasma generated by the glow discharge, and particles, such as atoms, discharged from the sample by the sputtering are excited and emit light. The component analysis for the sample is performed by spectroscopy of the generated light.

The pressure in the space between the cylindrical section of the electrode and the sample is required to be reduced to generate glow discharge. Pressure reduction has conventionally been made possible by blocking the opening section of the glow discharge tube opposed to the cylindrical section of the electrode with the sample. Hence, the sample is required to have a size capable of blocking the opening section of the glow discharge tube. Japanese Patent No. 4189290 discloses a technology for performing glow discharge optical emission spectrometry for a small-sized sample by producing a metal lump embedded with the small-sized sample and by blocking the opening section of the glow discharge tube with the produced metal lump.

SUMMARY

It is difficult to perform glow discharge optical emission spectrometry for a powder sample. It is assumed that glow discharge optical emission spectrometry is performed by mixing a powdery material to be analyzed with a binder, by compressing the mixture to produce a pellet-shaped compressed sample, and by blocking the opening section of the glow discharge tube with the compressed sample. However, since there are voids in the compressed sample, air enters through the voids when pressure reduction is carried out to perform glow discharge optical emission spectrometry. Hence, pressure reduction becomes insufficient, whereby the generation of plasma having sufficient purity by supplying an inert gas becomes difficult. Furthermore, since component analysis is affected by the components contained in the air, errors occur in the results of the analysis. Consequently, reliable component analysis cannot be performed for powdery material to be analyzed by the conventional method for performing glow discharge optical emission spectrometry.

The present disclosure is made in consideration of the above-mentioned circumstances, and it is an object to provide a method and tool for producing a sample containing object, a method for performing glow discharge optical emission spectrometry, a glow discharge optical emission spectrometer enabling reliable component analysis for a powdery material to be analyzed.

A method according to an aspect of the present disclosure, to perform glow discharge optical emission spectrometry using a glow discharge tube equipped with an electrode having an end section, for producing a sample containing object that is to be disposed so as to be opposed to the end section, comprises: covering one end of a sample holding section having a cylindrical shape and being open at both ends using a covering member; filling a powder sample containing a material to be analyzed into the sample holding section; compressing the powder sample by pressurizing the filled powder sample from the other end to the one end of the sample holding section; and removing the covering member from the sample holding section, thereby producing the sample containing object which includes the sample holding section and the compressed powder sample and from which the compressed powder sample is exposed from the one end.

In the aspect of the present disclosure, the one end of the cylindrical sample holding section being open at both ends is covered with the covering member, the powder sample containing the material to be analyzed is filled into the sample holding section, the powder sample is compressed by pressurizing the powder sample from the other end to the one end of the sample holding section. The sample containing object which includes the sample holding section and the compressed powder sample and from which the compressed powder sample is exposed from the one end is produced. When glow discharge optical emission spectrometry is performed, the sample containing object is mounted on the glow discharge tube so that the compressed powder sample is opposed to the end section of the electrode of the glow discharge tube, and the pressure in the glow discharge tube is reduced. Since the sample holding section does not allow air to pass through, the amount of air entering the glow discharge tube during the pressure reduction decreases in comparison with the case in which only the compressed sample is mounted on the glow discharge tube.

The method for producing the sample containing object according to another aspect of the present disclosure, further comprises pressing a plate having a size not larger than the inside diameter of the sample holding section against the filled powder sample from the other end to the one end, thereby pressurizing the powder sample, wherein the sample containing object includes the plate.

In the aspect of the present disclosure, the powder sample is pressurized by pressing a plate having a size not larger than the inside diameter of the sample holding section against the powder sample from the other end side. The plate is fixed at the portion located closer to the other end side than the compressed powder sample. Air is prevented from passing through the compressed powder sample by the fixed plate.

The method for producing the sample containing object according to another aspect of the present disclosure, further comprises: filling metal powder at the portion located closer to the other end side than the plate; and pressing a second plate having a size not larger than the inside diameter of the sample holding section against the filled metal powder from the other end to the one end, thereby pressurizing the powder sample and the metal powder, wherein the sample containing object includes the compressed metal powder and the second plate.

In the aspect of the present disclosure, the metal powder is filled into the space located closer to the other end side than the plate, the powder sample and the metal powder are pressurized by pressing the second plate against the metal powder from the other end side. The compressed metal powder and the second plate are fixed at the portions located closer to the other end side than the plate. Air is prevented from passing through the compressed powder sample by the compressed metal powder and the second plate.

In the method for producing the sample containing object according to another aspect of the present disclosure, the powder sample contains a powdery material to be analyzed and metal powder.

In the aspect of the present disclosure, the mixture of the powdery material to be analyzed and the metal powder is compressed by filling the powder sample containing the powdery material to be analyzed and the metal powder into the sample holding section. The metal powder is crushed while including the material to be analyzed, and the particles in the metal powder are bonded together, whereby the powder sample is easily compressed into a solid shape. Since the particles in the metal powder are bonded together, the voids in the compressed sample become scarce.

In the method for producing the sample containing object according to another aspect of the present disclosure, the respective particles of the metal powder have a dendrite shape.

In the aspect of the present disclosure, the respective particles of the metal powder have a dendrite shape. The respective particles contained in the metal powder easily take in the material to be analyzed, whereby the material to be analyzed and the metal powder in the powder sample are mixed uniformly.

The method for producing the sample containing object according to another aspect of the present disclosure, further comprises: mounting the sample holding section and the covering member on a mounting table with the one end side facing downward; pressurizing the filled powder sample downward; and sucking air inside the powder sample through the mounting table when the powder sample is pressurized.

In the aspect of the present disclosure, the sample holding section and the covering member are mounted on the mounting table with the one end side of the sample holding section facing downward, and the powder sample is pressurized downward. Furthermore, the air inside the powder sample is sucked through the mounting table during the pressurization. Since the powder sample is compressed while the air is sucked, the powder sample is compressed in high density.

In the method for producing the sample containing object according to another aspect of the present disclosure, the end section has a cylindrical shape, and the inside diameter of the sample holding section is larger than the inside diameter of the end section.

In the aspect of the present disclosure, the end section of the electrode of the glow discharge tube has a cylindrical shape, and the inside diameter of the sample holding section is larger than the inside diameter of the end section. Hence, the size of the powder sample compressed and exposed from the one end of the sample holding section becomes larger than the inside diameter of the end section of the electrode. Glow discharge is generated and the sample containing object is subjected to sputtering. When glow discharge optical emission spectrometry is performed, sputtering is mainly performed for the compressed powder sample that is opposed to the end section of the electrode. Hence, glow discharge optical emission spectrometry is mainly performed for the compressed powder sample.

A method for performing glow discharge optical emission spectrometry using a glow discharge tube equipped with an electrode having an end section according to an aspect of the present disclosure, comprises: covering one end of a cylindrical sample holding section being open at both ends using a covering member; filling a powder sample containing a material to be analyzed into the sample holding section; compressing the powder sample by pressurizing the filled powder sample from the other end to the one end of the sample holding section; removing the covering member from the sample holding section, thereby producing the sample containing object which includes the sample holding section and the compressed powder sample and from which the compressed powder sample is exposed from the one end, mounting the sample containing object on the glow discharge tube so that the compressed powder sample contained in the sample containing object is opposed to the end section, reducing the pressure inside the glow discharge tube, generating glow discharge by applying a voltage between the electrode and the sample containing object, and performing glow discharge optical emission spectrometry.

In the aspect of the present disclosure, the one end of the cylindrical sample holding section being open at both ends is covered with the covering member, the powder sample containing the material to be analyzed is filled into the sample holding section, the powder sample is compressed by pressurizing the powder sample from the other end to the one end of the sample holding section. The sample containing object which includes the sample holding section and the compressed powder sample and from which the compressed powder sample is exposed from the one end is produced. The sample containing object is mounted on the glow discharge tube so that the compressed powder sample is opposed to the end section of the electrode of the glow discharge tube, the pressure inside the glow discharge tube is reduced, glow discharge is generated by applying the voltage between the electrode and the sample containing object, and glow discharge optical emission spectrometry is performed. The amount of air entering the glow discharge tube during the pressure reduction decreases in comparison with the case in which only the compressed sample is mounted on the glow discharge tube. For this reason, the influence of the components in the air on the component analysis for the powdery material to be analyzed is lowered, and errors hardly occur in the results of the analysis.

In the method according to another aspect of the present disclosure, the end section has a cylindrical shape, and the size of the compressed powder sample being exposed from the one end of the sample containing object is larger than the inside diameter of the end section.

In the aspect of the present disclosure, the size of the compressed powder sample being exposed from the one end of the sample containing object is larger than the inside diameter of the end section of the electrode. When glow discharge optical emission spectrometry is performed, sputtering is mainly performed for the compressed powder sample that is opposed to the end section of the electrode.

Hence, glow discharge optical emission spectrometry is mainly performed for the compressed powder sample.

A tool for producing a sample containing object to be mounted on a glow discharge tube for glow discharge optical emission spectrometry according to an aspect of the present disclosure, comprises: a sample holding section having a cylindrical shape and being open at both ends; a covering member for covering one end of the sample holding section; a plate having a size not larger than the inside diameter of the sample holding section and being to be pressed against the powder sample filled into the sample holding section from the other end side; and a rod for pressurizing the powder sample by pressing the plate to the one end, thereby compressing the powder sample.

In the aspect of the present disclosure, the one end of the cylindrical sample holding section being open at both ends is covered with the covering member, the powder sample containing the material to be analyzed is filled into the sample holding section, the plate having the size not larger than the inside diameter of the sample holding section is pressed against the powder sample from the other end side, and the plate is pressed to the one end side using the rod, whereby the powder sample is compressed. The sample containing object which includes the sample holding section and the compressed powder sample and from which the compressed powder sample is exposed from the one end is produced.

The tool according to another aspect of the present disclosure, further comprises a mounting table on which the sample holding section and the covering member are mounted with the one end side of the sample holding section facing downward, wherein a communicating hole communicating with the portion on which the sample holding section and the covering member are mounted is provided in the mounting table.

In the aspect of the present disclosure, the sample holding section and the covering member are mounted on the mounting table with the one end side of the sample holding section facing downward, and the powder sample is compressed downward. The communicating hole communicating with the portion on which the sample holding section and the covering member are mounted is provided in the mounting table. When the powder sample is compressed, the air inside the powder sample can be sucked through the communicating hole. Since the powder sample is compressed while the air is sucked, the powder sample is compressed in high density.

A glow discharge optical emission spectrometer according to an aspect of the present disclosure, comprises: a glow discharge tube equipped with an electrode having an end section; a pressure reducing section configured to reduce the pressure inside of the glow discharge tube; a pressing section for pressing a sample containing object which includes a sample holding section having a cylindrical shape and being open at both ends and a powder sample compressed inside the sample holding section and from which the powder sample is exposed from the one end of the sample holding section to the glow discharge tube so that the powder sample is opposed to the end section; and a power source section configured to generate glow discharge by applying a voltage between the electrode and the sample containing object.

In the aspect of the present disclosure, the glow discharge optical emission spectrometer presses the sample containing object which includes the sample holding section and the compressed powder sample and from which the compressed powder sample is exposed from the one end against the glow discharge tube so that the powder sample is opposed to the end section of the electrode. Furthermore, the glow discharge optical emission spectrometer performs glow discharge optical emission spectrometry by reducing the pressure inside the glow discharge tube and by applying the voltage between the electrode and the sample containing object. The amount of air entering the glow discharge tube during the pressure reduction decreases in comparison with the case in which only the compressed sample is mounted on the glow discharge tube. Since air hardly enters, the influence of the components in the air on the component analysis for the powdery material to be analyzed is lowered, and errors hardly occur in the results of the analysis.

With an aspect of the present disclosure, since the amount of air entering the glow discharge tube is reduced during the pressure reduction, the glow discharge optical emission spectrometer can perform sufficient pressure reduction and can generate plasma having sufficient purity for performing glow discharge optical emission spectrometry. Furthermore, since sufficient pressure reduction is made possible, the amount of air excited by the glow discharge is small, and the influence of the components in the air on the component analysis for the powdery material to be analyzed is small. Hence, the aspect of the present disclosure has excellent advantages such that reliable component analysis can be performed for powdery material to be analyzed.

The above and further objects and features will more fully be apparent from the following detailed description with accompanying drawings.

DETAILED DESCRIPTION

The present disclosure will be described below specifically on the basis of the drawings showing embodiments thereof.

Embodiment 1

Figure 1:
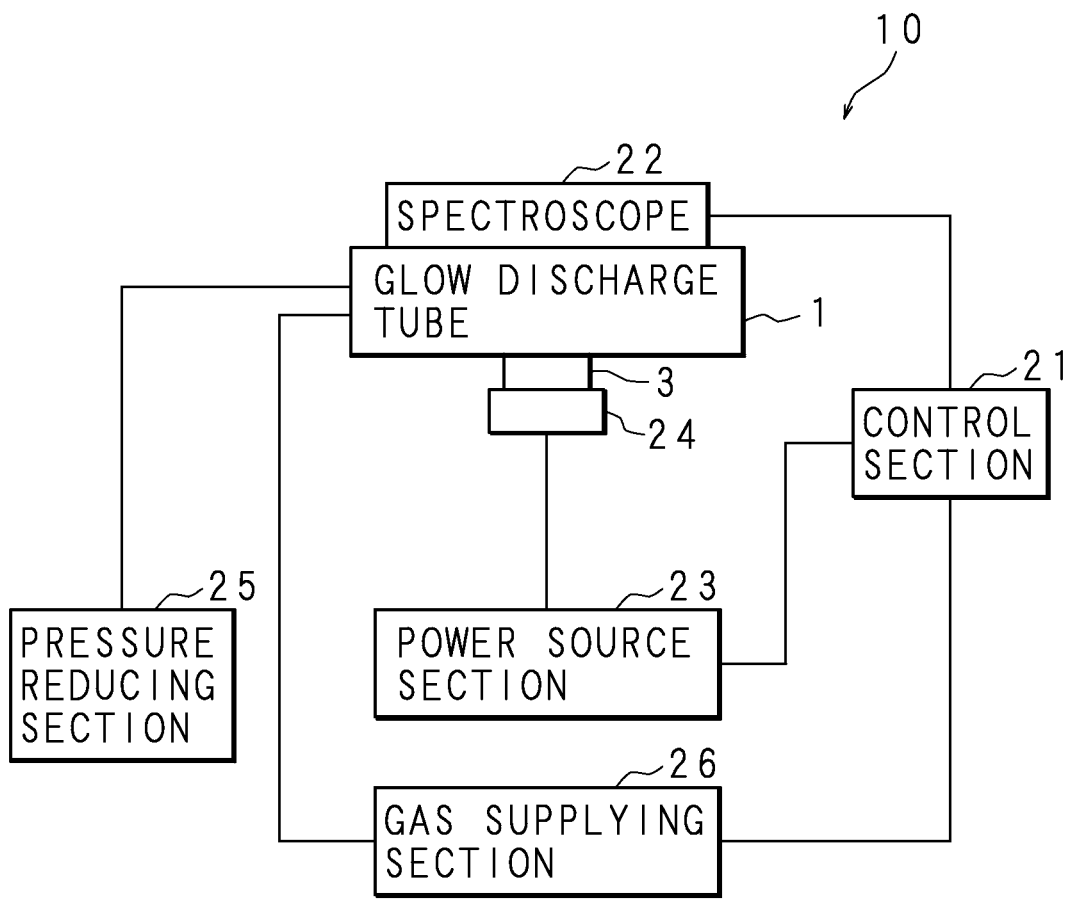
FIG. 1 is a block diagram showing a configuration of a glow discharge optical emission spectrometer.

FIG. 1 is a block diagram showing a configuration of a glow discharge optical emission spectrometer 10. The glow discharge optical emission spectrometer 10 is equipped with a glow discharge tube 1 for generating glow discharge, a spectroscope 22 for dispersing the light generated by the glow discharge and for measuring the intensity of the dispersed light, a power source section 23 for generating a high-frequency voltage for generating the glow discharge, and a control section 21 for entirely controlling the glow discharge optical emission spectrometer 10. A sample containing object 3 including a material to be analyzed is disposed while being pressed against the glow discharge tube 1 using a pressing electrode 24. The pressing electrode 24 is formed into a block shape and is connected to the power source section 23. The pressing electrode 24 corresponds to the pressing section in the present disclosure.

Furthermore, the glow discharge optical emission spectrometer 10 is equipped with a pressure reducing section 25, such as a vacuum pump, for reducing the pressure inside the glow discharge tube 1, and a gas supplying section 26 for supplying argon gas to the inside of the glow discharge tube 1 after the pressure reduction. A pressure reducing pipe is disposed between the pressure reducing section 25 and the glow discharge tube 1. The gas supplying section 26 includes a gas cylinder filled with argon gas, and a pipe for supplying argon gas is disposed from the gas supplying section 26 to the glow discharge tube 1. The gas supplying section 26 is equipped with a solenoid valve for adjusting the flow rate of the argon gas. The glow discharge optical emission spectrometer 10, however, may be configured so as to generate glow discharge by using gas other than argon gas. In the case of this configuration, the gas supplying section 26 supplies gas other than argon gas.

The control section 21 is composed of a computer and is equipped with an arithmetic operation section for performing arithmetic operations, a memory, a storage section for storing data, and a display section for displaying information. The spectroscope 22, the power source section 23 and the gas supplying section 26 are connected to the control section 21. The control section 21 controls the operations of the spectroscope 22, the power source section 23 and the gas supplying section 26.

Figure 2:
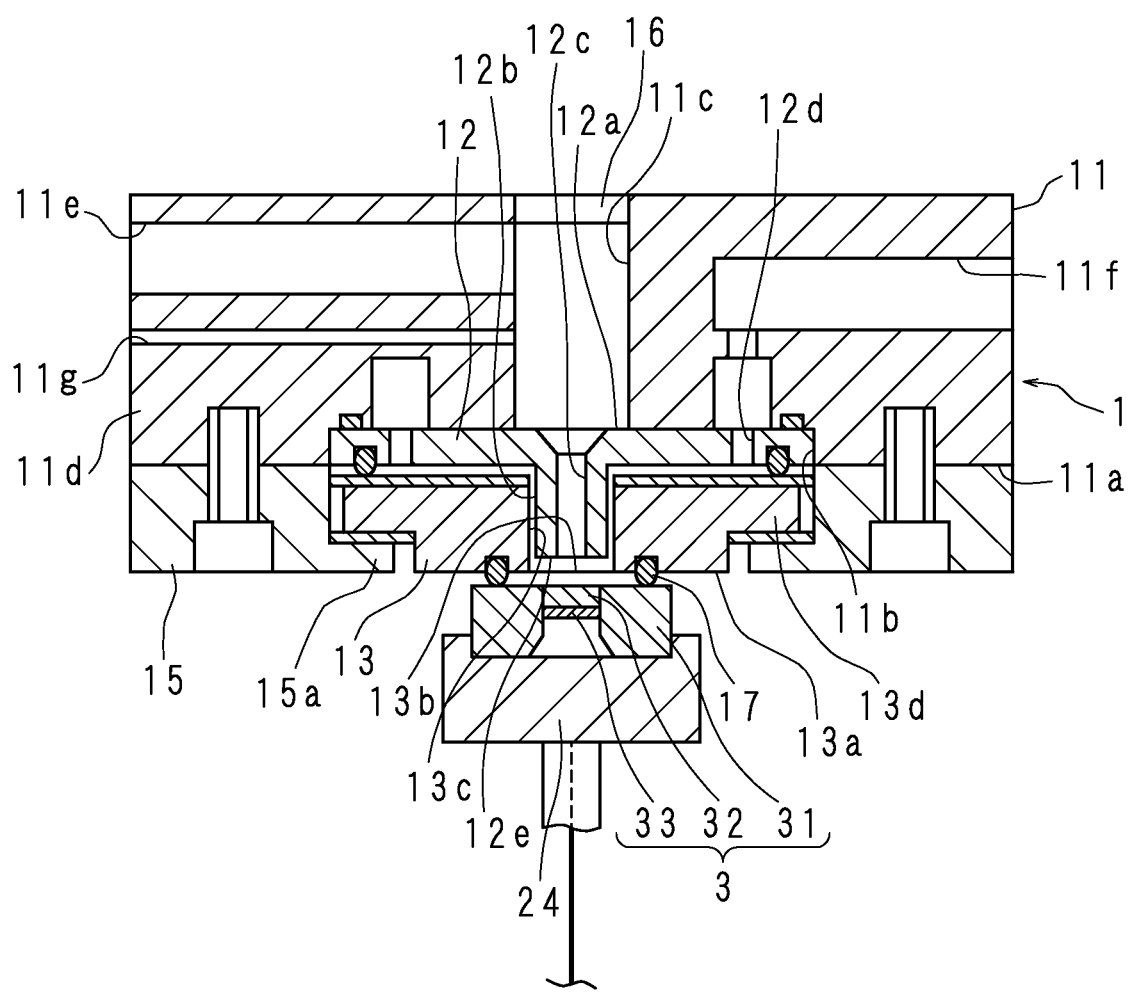
FIG. 2 is a sectional view showing an internal configuration of a glow discharge tube and a sample containing object according to Embodiment 1.

FIG. 2 is a sectional view showing an internal configuration of the glow discharge tube 1 and the sample containing object 3 according to Embodiment 1. The glow discharge tube 1 is configured by combining a short cylindrical lamp body 11, an anode 12, a ceramic member 13 and a pressing block 15. The anode 12 corresponds to the electrode in the present disclosure.

The lamp body 11 is provided with a hollow section 11b, which is recessed on and on which the anode 12 is mounted, at the center section of the end face 11a of the lamp body 11 with which the pressing block 15 is combined. And the lamp body 11 is provided with a center hole 11c at the center section of the hollow section 11b. Furthermore, the lamp body 11 is provided with a plurality of pressure reducing suction holes 11e and 11f extended from the peripheral wall section 11d to the center of the lamp body 11. Some of the suction holes, that is, the suction holes 11e, communicate with the center hole 11c, and the other suction holes, that is, the suction holes 11f, communicate with the hollow section 11b. Pipes connected to the pressure reducing section 25 are connected to the suction holes 11e and 11f. Moreover, a gas supplying hole 11g for supplying argon gas is formed in the direction from the peripheral wall section 11d to the center of the lamp body 11 so as to communicate with the center hole 11c. A pipe connected to the gas supplying section 26 is connected to the gas supplying hole 11g. Still further, a grounding wire is connected to the lamp body 11, and the lamp body 11 has ground potential.

The anode 12 accommodated in the hollow section 11b of the lamp body 11 has a cylindrical section (end section) 12b protruding from the center of the disc section 12a thereof. A through hole 12c passing through the disc section 12a from the inside of the cylindrical section 12b is bored. In addition, holes 12d are also formed in the disc section 12a. In the state in which the anode 12 is mounted on the hollow section 11b of the lamp body 11, the center hole 11c of the lamp body 11 and the through hole 12c communicate with each other substantially coaxially. When the anode 12 is mounted on the hollow section 11b of the lamp body 11, the anode 12 has ground potential via the lamp body 11. Furthermore, in the state in which the anode 12 is mounted on the lamp body 11, the cylindrical section 12b is in a state of protruding from the end face 11a of the lamp body 11. An O-ring is installed between the lamp body 11 and the anode 12 to maintain the sealability in the center hole 11c of the lamp body 11 and the through hole 12c of the anode 12.

A light transmitting window 16 is provided at the end of the center hole 11c of the lamp body 11 on the opposite side of the end communicating with the through hole 12c of the anode 12. The spectroscope 22 is connected to the outside of the window 16. The spectroscope 22 disperses the light having transmitted through the window 16 and entered the spectroscope 22 using a diffraction grating or the like and measures the intensity of the dispersed light of each wavelength using a photomultiplier or the line. The operation of the spectroscope 22 is controlled by the control section 21 and the results of the measurement are input to the control section 21.

The ceramic member 13 disposed so as to cover the anode 12 is made of an insulating ceramic material. The ceramic member 13 is formed into a thick disc shape and has a flange section 13d covering the disc section 12a of the anode 12. An insertion hole 13c into which the cylindrical section 12b of the anode 12 inserted is formed at the center position of the ceramic member 13. The ceramic member 13 is disposed so as to be opposed to the disc section 12a of the anode 12, and an O-ring is installed between the ceramic member 13 and the disc section 12a to maintain sealability therebetween. In the state in which the ceramic member 13 is disposed, a predetermined clearance is formed between the insertion hole 13c and the cylindrical section 12b of the anode 12.

The pressing block 15 for fixing the anode 12 and the ceramic member 13 to the lamp body 11 is a member made of an insulating material and formed into an annular shape. The protruding section 15a provided on the inner peripheral edge side of the pressing block 15 is used to press the flange section 13d of the ceramic member 13 to the lamp body 11. The pressing block 15 is mounted on the end face 11a of the lamp body 11 with bolts. The pressing block 15 is mounted so as to protrude from the end face 11a of the lamp body 11, and the ceramic member 13 and the cylindrical section 12b of the anode 12 are disposed inside the pressing block 15. The insertion hole 13c is open in the end face 13a of the ceramic member 13, and the cylindrical section 12b of the anode 12 is disposed in the insertion hole 13c. The opening end of the insertion hole 13c is the opening section 13b of the glow discharge tube 1, and the opening section 13b is located so as to be opposed to the tip end 12e of the cylindrical section 12b.

An O-ring 17 surrounding the opening section 13b is disposed on the end face 13a of the ceramic member 13. The sample containing object 3 is disposed so that its surface makes contact with the O-ring 17. The details of the sample containing object 3 will be described later. The pressing electrode 24 is pressed against the rear side of the sample containing object 3, whereby the sample containing object 3 is pressed to the glow discharge tube 1. The pressing electrode 24 presses the sample containing object 3 to the glow discharge tube 1 using a predetermined engaging means, not shown. In this way, the sample containing object 3 is disposed so as to block the opening section 13b, and the surface of the sample containing object 3 is opposed to the tip end 12e of the cylindrical section 12b of the anode 12. The pressure reducing section 25 reduces the pressure inside the glow discharge tube 1, whereby the sample containing object 3 is fixed.

Figure 3:
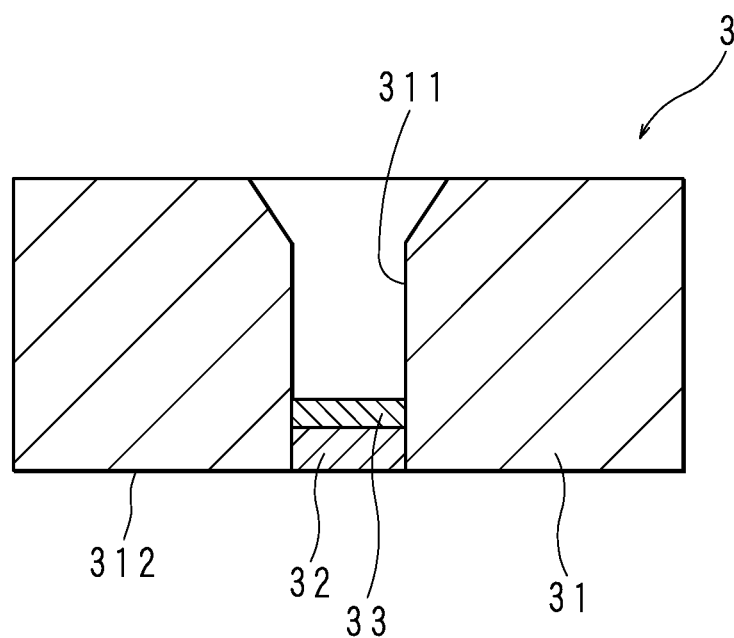
FIG. 3 is a schematic sectional view showing the sample containing object according to Embodiment 1.

FIG. 3 is a schematic sectional view showing the sample containing object 3 according to Embodiment 1. The sample containing object 3 includes a sample holding section 31 having a cylindrical shape and being open at both ends, a compressed sample 32 obtained when powder containing a material to be analyzed is compressed and formed into a pellet shape, and a pressurizing chip 33. A through hole 311 is provided in the sample holding section 31 and is open at both ends of the sample holding section 31. The compressed sample 32 is disposed inside the through hole 311 and located in the vicinity of one end of the sample holding section 31. Since the compressed sample 32 is disposed inside the through hole 311, the sample holding section 31 holds the sample containing the material to be analyzed. At the one end of the sample holding section 31, the through hole 311 is blocked with the compressed sample 32, and the compressed sample 32 is exposed. The one end of the sample holding section 31 of both ends thereof, in which the compressed sample 32 is exposed, is defined as the end on the front side, and the other end is defined as the end on the rear side. In FIG. 3, the lower side is the front side, and the upper side is the rear side. The end face 312 of the sample holding section 31 on the front side is preferably flush with the surface of the compressed sample 32. The pressurizing chip 33 is a plate having a size not larger than the diameter of the through hole 311. The diameter of the through hole 311 corresponds to the inside diameter of the sample holding section 31. The pressurizing chip 33 is disposed inside the through hole 311 and located closer to the rear side than the compressed sample 32. The size of the pressurizing chip 33 is preferably nearly equal to the diameter of the through hole 311. The sample holding section 31 and the pressurizing chip 33 are made of metals.

Figure 4:
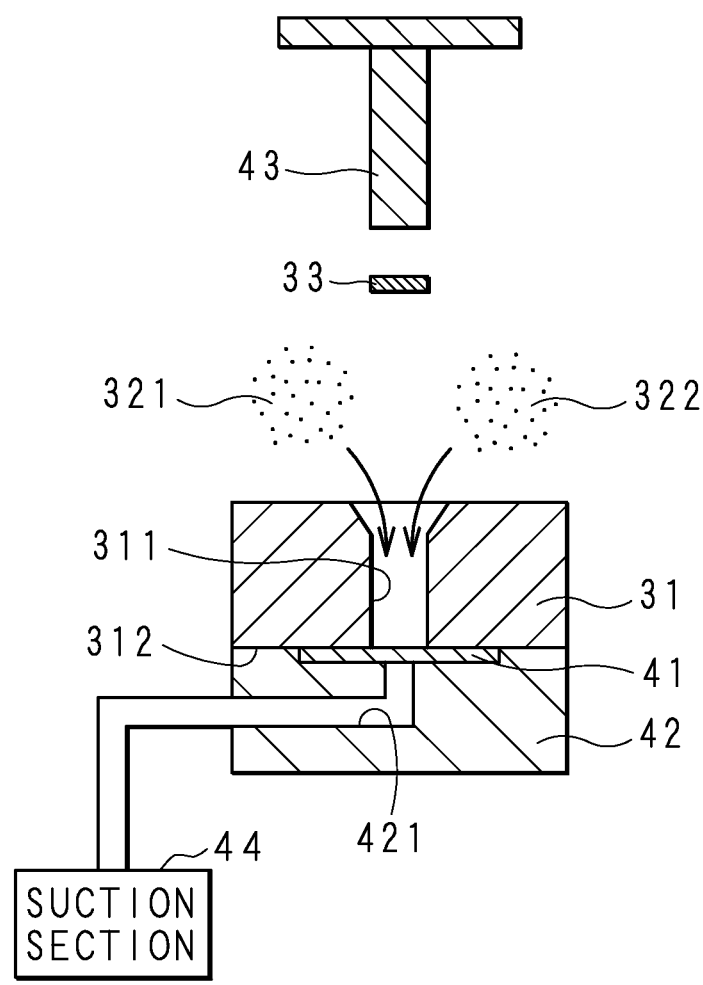
FIG. 4 is a schematic sectional view showing a tool for producing the sample containing object and a method for producing the sample containing object according to Embodiment 1.
Figure 5:
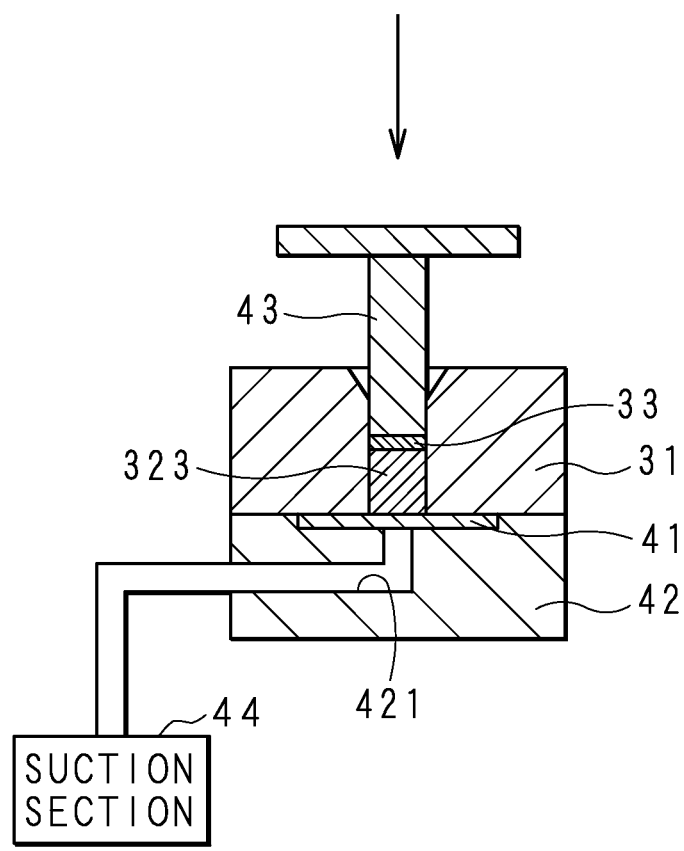
FIG. 5 is another schematic sectional view showing a tool for producing the sample containing object and a method for producing the sample containing object according to Embodiment 1.

FIGS. 4 and 5 are schematic sectional views showing a tool for producing the sample containing object 3 and a method for producing the sample containing object 3 according to Embodiment 1. The tool for producing the sample containing object 3 includes a covering member 41 for covering the front side end of the sample holding section 31, a mounting table 42 and a pressurizing rod 43, in addition to the sample holding section 31 and the pressurizing chip 33. The pressurizing rod 43 corresponds to the rod in the present disclosure. The covering member 41 is a plate having a size larger than the diameter of the through hole 311. The size of the covering member 41 is preferably smaller than the outside diameter of the sample holding section 31. The covering member 41 makes contact with the front side end face 312 of the sample holding section 31 and is disposed so as to cover the front side opening of the through hole 311. The sample holding section 31 and the covering member 41 are placed on the mounting table 42 with the front side of the sample holding section 31 facing downward. The mounting table 42 is formed into a shape in which the sample holding section 31 and the covering member 41 covering the front side end of the sample holding section 31 can be mounted thereon. A communicating hole 421 communicating with the portion on which the sample holding section 31 and the covering member 41 are mounted is provided in the mounting table 42. The communicating hole 421 is connected to a suction section 44 for sucking air. The suction section 44 is, for example, a vacuum pump.

As shown in FIGS. 4 and 5, for the purpose of producing the sample containing object 3, first, a powdery material 321 to be analyzed and metal powder 322 are mixed, and a powder sample 323 obtained by mixing the material 321 to be analyzed and the metal powder 322 is filled in the through hole 311 of the sample holding section 31. The material 321 to be analyzed is the powder of the material to be analyzed, the components of which are analyzed by glow discharge optical emission spectrometry. For example, the material 321 to be analyzed is powder of a component, such as oxide, nitride or carbide, or powder of a material containing a plurality of components. More specifically, for example, the material 321 to be analyzed is powder of an ore or powder of a catalyst. The metal powder 322 is powder of soft metal, such as copper, tin or indium. The material 321 to be analyzed and the metal powder 322 are not the same powder. The powder sample 323 contains the powdery material 321 to be analyzed and the metal powder 322.

Next, inside the through hole 311 of the sample holding section 31, the pressurizing chip 33 is disposed on the rear side of the powder sample 323. The through hole 311 filled with the powder sample 323 is thus plugged with the pressurizing chip 33. Next, as shown in FIG. 5, the pressurizing chip 33 is pressed with the pressurizing rod 43 from the rear side to the front side. The direction of the pressing is indicated by an arrow in FIG. 5. Since the pressurizing chip 33 is pressed with the pressurizing rod 43, the pressurizing chip 33 is pressed against the powder sample 323, and the powder sample 323 is pressurized with the pressurizing chip 33, whereby the powder sample 323 is compressed between the pressurizing chip 33 and the covering member 41. At this time, the powder sample 323 is compressed by pressing the pressurizing rod 43 using a pressing machine, for example. Furthermore, at this time, air is sucked using the section 44. Air inside the powder sample 323 is sucked to the outside through the clearance between the sample holding section 31 and the covering member 41, through the clearance between the covering member 41 and the mounting table 42, and through the communicating hole 421 provided in the mounting table 42. Since the powder sample 323 is compressed while the air is sucked, the voids inside the powder sample 323 are reduced, whereby the powder sample 323 is compressed in high density. Since the powder sample 323 is compressed, the metal powder 322 is crushed while including the material 321 to be analyzed, and the particles in the metal powder 322 are bonded together. The powder sample 323 is formed into a pellet-shaped compressed sample 32 for filling the space between the pressurizing chip 33 and the covering member 41 inside the through hole 311. The compressed sample 32 is the compressed powder sample 323.

In the state in which the powder sample 323 is sufficiently compressed, the sample holding section 31 is removed from the mounting table 42, and the covering member 41 and the pressurizing rod 43 are removed from the sample holding section 31, whereby the sample containing object 3 is completed as shown in FIG. 3. The compressed sample 32 is formed by compressing the powder sample 323. The compressed sample 32 is made pressure contact with the inner wall of the through hole 311 and the compressed sample 32 is fixed to the sample holding section 31 by compressing the powder sample 323. Furthermore, the pressurizing chip 33 is made pressure contact with the compressed sample 32 and the clearance between the pressurizing chip 33 and the inner wall of the through hole 311 is blocked with part of the powder sample 323 by pressing the pressurizing chip 33 against the compressed sample 32 and by compressing the powder sample 323. Hence, the pressurizing chip 33 is fixed to the sample holding section 31 and is disposed on the rear side of the compressed sample 32. The method for producing the sample containing object 3 having been described above referring to FIGS. 4 and 5 is taken as an example, and the respective steps included in the method may be replaced as necessary.

For the purpose of performing glow discharge optical emission spectrometry, the sample containing object 3 is mounted on the glow discharge tube 1 as shown in FIG. 2. At this time, the sample containing object 3 is disposed so that the opening section 13*b* is blocked with the front side end of the sample containing object 3. More specifically, the sample containing object 3 is disposed so that the surface of the compressed sample 32 exposed to the front side end of the sample holding section 31 is opposed to the tip end 12*e* of the cylindrical section 12*b* of the anode 12. Positioning sections including concave and convex may be provided on the end face 13*a* of the ceramic member 13 and the front side end face 312 of the sample holding section 31 so that the compressed sample 32 can be opposed to the tip end 12*e* of the cylindrical section 12*b*. The concave and convex are configured so as to be engaged with each other when the end face 13*a* and the end face 312 are placed at appropriate relative positions. The outer shape size of the sample holding section 31 is larger than the outside diameter of the O-ring 17. Furthermore, the diameter of the front side opening section of the through hole 311 is smaller than the inside diameter of the O-ring 17. The O-ring 17 makes contact with the front side end face 312 of the sample holding section 31. The opening section 13*b* is blocked with the front side end of the sample containing object 3, whereby the pressure inside the glow discharge tube 1 can be reduced. The pressing electrode 24 holds the rear side end of the sample containing object 3 and presses the sample containing object 3 from the rear side of the sample containing object 3 to the glow discharge tube 1. In this way, the sample containing object 3 is mounted on the glow discharge tube 1.

In the state in which the sample containing object 3 is disposed so as to block the opening section 13*b*, the pressure inside the glow discharge tube 1 is reduced using the pressure reducing section 25. Next, the gas supplying section 26 supplies argon gas to the inside of the glow discharge tube 1. Next, the power source section 23 supplies a high-frequency voltage to the pressing electrode 24 under the control of the control section 21. Since argon gas is supplied to the space between the tip end 12*e* of the cylindrical section 12*b* of the anode 12 and the surface of the compressed sample 32 as necessary and the high-frequency voltage is supplied to the pressing electrode 24, a voltage is applied between the anode 12 and the compressed sample 32, and glow discharge is generated between the anode 12 and the compressed sample 32 in an argon gas atmosphere. Plasma containing argon ions is produced by the generation of the glow discharge. The argon ions in the plasma are accelerated inside the through hole 12*c* by the voltage and collide with the surface of the compressed sample 32 that is opposed to the tip end 12*e* of the cylindrical section 12*b*, whereby sputtering is performed. The components of the compressed sample 32 scatter as particles from the surface of the compressed sample 32 by the sputtering. In other words, the components of the material 321 to be analyzed, contained in the compressed sample 32, scatter as particles. The scattered particles are excited by the glow discharge and emit light having wavelengths unique to elements contained in the particles. The emitted light is transmitted through the window 16 and enters the spectroscope 22, and the spectroscope 22 disperses the entered light and measures the intensity of the dispersed light having each wavelength, and the results of the measurement are input to the control section 21. On the bases of the results of the measurement input from the spectroscope 22, the control section 21 performs glow discharge optical emission spectrometry in which qualitative analysis or quantitative analysis is performed for the components contained in the compressed sample 32. In this way, glow discharge optical emission spectrometry for the material 321 to be analyzed is performed.

The diameter of the through hole 311 is preferably larger than the inside diameter of the tip end 12*e* of the cylindrical section 12*b*. Since the diameter of the through hole 311 is larger than the inside diameter of the tip end 12*e*, the size of the compressed sample 32 becomes larger than the inside diameter of the tip end 12*e* of the cylindrical section 12*b*. Since the compressed sample 32 is opposed to the tip end 12*e* of the cylindrical section 12*b*, sputtering is performed for the compressed sample 32. In particular, since the size of the compressed sample 32 is larger than the inside diameter of the tip end 12*e*, sputtering is mainly performed for the compressed sample 32, and glow discharge optical emission spectrometry is mainly performed for the compressed sample 32. Since the degree of the effect of the sputtering on the sample holding section 31 that is located away from the position opposed to the tip end 12*e* is small, the influence of the sample holding section 31 on the component analysis for the material 321 to be analyzed is small.

In this embodiment, the sample holding section 31 is included in the sample containing object 3 to be mounted on the glow discharge tube 1. Since the sample holding section 31 does not allow air to pass through, the amount of air entering the glow discharge tube 1 during the pressure reduction decreases and the pressure reduction can be performed effectively in comparison with the case in which only the compressed sample is mounted on the glow discharge tube 1. Furthermore, in this embodiment, since the pressurizing chip 33 is pressed against the rear side of the powder sample 323, the powder sample 323 can be compressed efficiently, and the pressurizing chip 33 blocks the through hole 311 and is fixed to the rear side of the compressed sample 32. Since the pressurizing chip 33 does not allow air to pass through and since the pressurizing chip 33 is fixed to the rear side of the compressed sample 32, air is prevented from passing through the compressed sample 32. Hence, the pressure reduction can be performed more effectively. Furthermore, in this embodiment, since the powder sample 323 is compressed while air is sucked, the voids inside the powder sample 323 are reduced and the powder sample 323 is compressed in high density. For this reason, voids are scarce inside the compressed sample 32 and air hardly passes through the compressed sample 32, whereby the pressure reduction can be performed more effectively. Moreover, in this embodiment, the compressed sample 32 is produced by compressing the powder sample 323 obtained by mixing the metal powder 322 with the material 321 to be analyzed. Since the metal powder 322 is crushed while including the material 321 to be analyzed and the particles in the metal powder 322 are bonded together, the compressed sample 32 containing the material 321 to be analyzed is easily formed into a solid shape. Since the particles in the metal powder 322 are bonded together, the compressed sample 32 having scarce voids is generated. As a result, the pressure reduction can be performed more effectively.

Since effective pressure reduction is made possible, the glow discharge optical emission spectrometer 10 can perform sufficient pressure reduction and can generate plasma having sufficient purity. Furthermore, since sufficient pressure reduction is made possible, the amount of the air excited by glow discharge is small, and the influence of the components in the air on the component analysis for the material 321 to be analyzed is small. Errors due to the influence of the components in the air hardly occur in the results of the analysis. Hence, the reliability of the component analysis for the powdery material 321 to be analyzed is improved.

Still further, the respective particles of the metal powder 322 contained in the powder sample 323 preferably have a dendrite shape. The particle having the dendrite shape has a large surface area and tends to intertwine with other particles. Hence, the respective particles contained in the metal powder 322 easily take in the material 321 to be analyzed, whereby the material 321 to be analyzed is uniformly mixed in the powder sample 323. The material 321 to be analyzed is thus distributed uniformly in the compressed sample 32, whereby it is possible to obtain stable results of the component analysis for the material 321 to be analyzed.

Figure 6A:
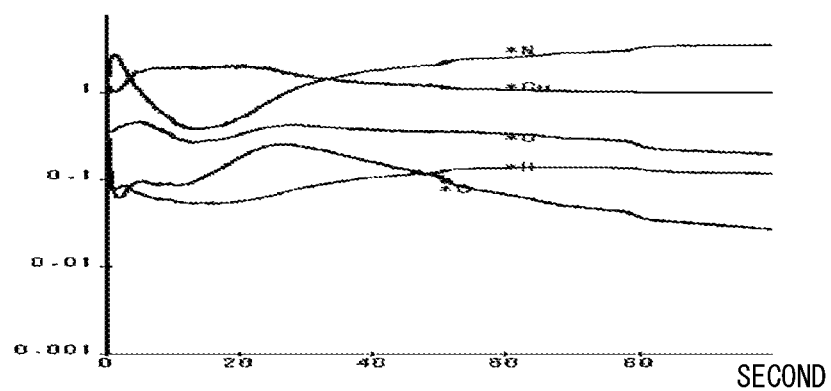
FIGS. 6A and 6B are characteristic diagrams showing examples of the results of glow discharge optical emission spectrometry.
Figure 6B:
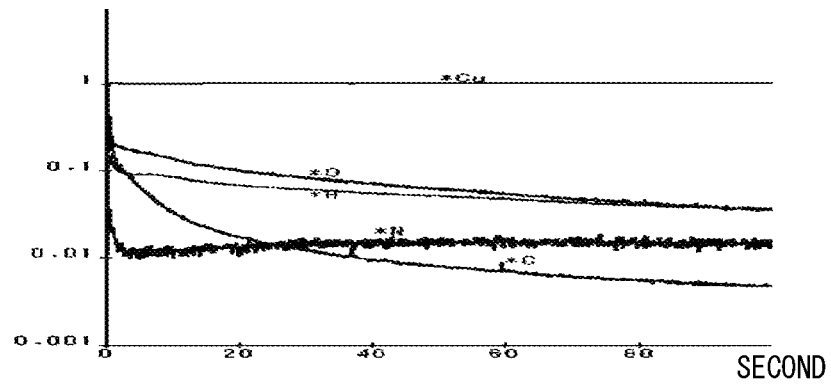

FIGS. 6A and 6B are characteristic diagrams showing examples of the results of glow discharge optical emission spectrometry. FIG. 6A indicates the results in the case that the glow discharge optical emission spectrometry is performed by the conventional method, and FIG. 6B indicates the results in the case that glow discharge optical emission spectrometry is performed by the method according to Embodiment 1. Each of the horizontal axes in FIGS. 6A and 6B indicates the time during which the measurement is continued, and each of the vertical axes indicates the measured relative amount of each component in a logarithmic scale. FIGS. 6A and 6B show the results of the analysis for the components including copper (Cu), nitrogen (N), oxygen (O), hydrogen (H) and carbon (C). Glow discharge optical emission spectrometry is performed by using copper powder as the material 321 to be analyzed. In the conventional method, only the compressed sample obtained by compressing the material 321 to be analyzed is mounted on the glow discharge optical emission spectrometer, and glow discharge optical emission spectrometry is performed. As shown in FIG. 6A, in the conventional method, the measured amount of each component fluctuates and stable analysis results are not obtained. Furthermore, components contained in the air, such as N and O, are abundantly measured. It is assumed that the cause of this problem is that pressure reduction is insufficient, that plasma having sufficient purity for stable measurement of the respective components is not generated, and that the components contained in the air are measured. As shown in FIG. 6B, in this embodiment, the measured amount of each component is stable; in particular, the measured amount of Cu serving as the main component is stable. Furthermore, the measured amounts of components contained in the air are scarce. As described above, in this embodiment, the results of the glow discharge optical emission spectrometry are stable, and the influence of the air on the results of the analysis is small. Hence, the glow discharge optical emission spectrometer 10 can perform highly reliable component analysis for the powdery material 321 to be analyzed.

The sample containing object 3, however, can also be produced by directly pressurizing the powder sample 323 from the rear side without using the pressurizing chip 33. Furthermore, the sample containing object 3 can also be produced by compressing the powder sample 323 containing the powdery material 321 to be analyzed and not containing the metal powder 322. Moreover, the sample containing object 3 can also be produced without performing air suction using the suction section 44. Still further, the sample containing object 3 can also be produced without mounting the sample holding section 31 and the covering member 41 on the mounting table 42. Even in the cases that the sample containing object s 3 produced by these methods are used, air is prevented from passing through by the sample holding section 31, whereby effective pressure reduction is made possible, and highly reliable component analysis for the material 321 to be analyzed can be performed.

Embodiment 2

Figure 7:
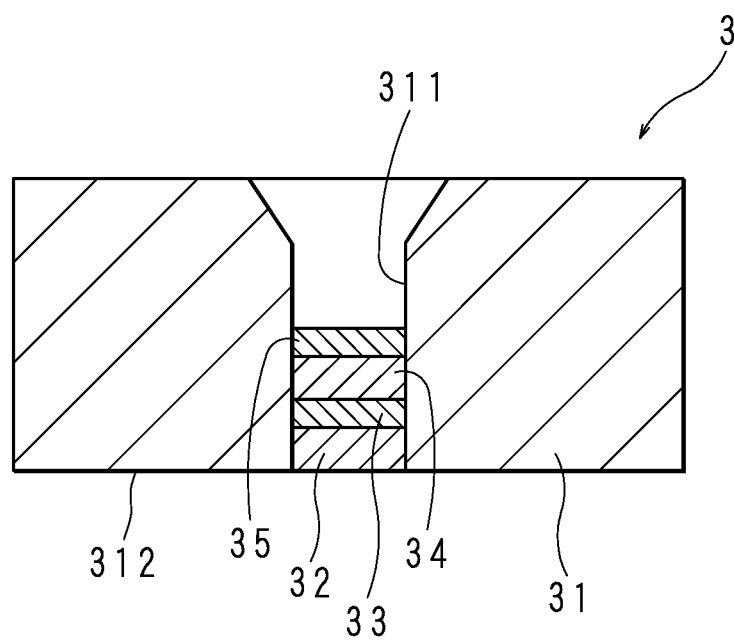
FIG. 7 is a schematic sectional view showing a sample containing object 3 according to Embodiment 2.

FIG. 7 is a schematic sectional view showing a sample containing object 3 according to Embodiment 2. As in Embodiment 1, the sample containing object 3 includes the sample holding section 31, the compressed sample 32 and the pressurizing chip 33. In this embodiment, the sample containing object 3 further includes metal powder 34 disposed on the rear side of the pressurizing chip 33 and a second pressurizing chip 35 disposed on the rear side of the metal powder 34. The metal powder 34 is powder similar to the metal powder 322. The metal powder 34, however, may be powder containing components different from those of the metal powder 322. The second pressurizing chip 35 is a plate similar to the pressurizing chip 33. The second pressurizing chip 35 corresponds to a second plate in the present disclosure. The configuration of the glow discharge optical emission spectrometer 10 is similar to that according to Embodiment 1 except for the sample containing object 3.

Also in this embodiment, as in Embodiment 1, the powder sample 323 is compressed and the compressed sample 32 is produced by pressing the pressurizing chip 33 from the rear side to the front side using the pressurizing rod 43. Next, the metal powder 34 is filled in the through hole 311 of the sample holding section 31 at the portion located closer to the rear side than the pressurizing chip 33, and the second pressurizing chip 35 is disposed on the rear side of the metal powder 34. Next, the second pressurizing chip 35 is pressed from the rear side to the front side using the pressurizing rod 43. The metal powder 34 is compressed between the pressurizing chip 33 and the second pressurizing chip 35. After the compression, the metal powder 34 and the second pressurizing chip 35 are fixed to the sample holding section 31. The method for producing the sample containing object 3 having been described above is taken as an example, and the respective steps included in the method may be replaced as necessary. Furthermore, the powder sample 323 and the metal powder 34 may be pressurized individually by pressurizing the powder sample 323 using the pressurizing chip 33 and then by pressurizing the metal powder 34 using the second pressurizing chip 35, or the powder sample 323 and the metal powder 34 may be pressurized simultaneously using the second pressurizing chip 35.

As in Embodiment 1, the sample containing object 3 is mounted on the glow discharge tube 1 so that front side end of the sample containing object 3 blocks the opening section 13b, the pressure inside the glow discharge tube 1 is reduced, argon gas is supplied, and a high-frequency voltage is supplied to the pressing electrode 24. Glow discharge is generated, and glow discharge optical emission spectrometry is performed for the material 321 to be analyzed. In this embodiment, the compressed metal powder 34 and the second pressurizing chip 35 are fixed at the portions located closer to the rear side than the pressurizing chip 33. Hence, during the pressure reduction, air is effectively prevented from passing through the compressed sample 32, whereby the pressure reduction can be performed more effectively. Hence, the glow discharge optical emission spectrometer 10 can perform sufficient pressure reduction and can generate plasma having sufficient purity. Furthermore, the influence of the components in the air on the component analysis for the material 321 to be analyzed is small, whereby errors hardly occur in the results of the analysis. Hence, the reliability of the component analysis for the powdery material 321 to be analyzed is improved.

It is construed that the embodiments disclosed this time are examples in all respects and do not limit the concept of the present invention. The scope of the present invention is defined not by the above descriptions but by the claims, and the present invention is intended to include all modifications within the meaning and the range of equivalency of the claims.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

What is claimed is:

1. A method, to perform glow discharge optical emission spectrometry using a glow discharge tube equipped with an electrode having an end section, for producing a sample containing object that is to be disposed so as to be opposed to the end section, comprising:
    covering one end of a sample holding section having a cylindrical shape and being open at both ends using a covering member;
    filling a powder sample containing a material to be analyzed into the sample holding section;
    compressing the powder sample by pressurizing the filled powder sample from the other end to the one end of the sample holding section; and
    removing the covering member from the sample holding section, thereby producing the sample containing object which includes the sample holding section and the compressed powder sample and from which the compressed powder sample is exposed from the one end, wherein
    an outer shape size of the sample holding section at the one end is larger than an inside diameter of an opening end of a hole which is formed in the glow discharge tube and in which the end section is disposed.

2. The method for producing the sample containing object according to claim 1, further comprising
    pressing a plate having a size not larger than the inside diameter of the sample holding section against the filled powder sample from the other end to the one end, thereby pressurizing the powder sample, wherein
    the sample containing object includes the plate.

3. The method for producing the sample containing object according to claim 2, further comprising:
    filling metal powder at the portion located closer to the other end side than the plate; and
    pressing a second plate having a size not larger than the inside diameter of the sample holding section against the filled metal powder from the other end to the one end, thereby pressurizing the powder sample and the metal powder, wherein
    the sample containing object includes the compressed metal powder and the second plate.

4. The method for producing the sample containing object according to claim 1, wherein
    the powder sample contains a powdery material to be analyzed and metal powder.

5. The method for producing the sample containing object according to claim 4, wherein
    the respective particles of the metal powder have a dendrite shape.

6. The method for producing the sample containing object according to claim 1, further comprising:
    mounting the sample holding section and the covering member on a mounting table with the one end side facing downward;
    pressurizing the filled powder sample downward; and
    sucking air inside the powder sample through the mounting table when the powder sample is pressurized.

7. The method for producing the sample containing object according to claim 1, wherein
    the end section has a cylindrical shape, and
    the inside diameter of the sample holding section is larger than the inside diameter of the end section.

8. A method for performing glow discharge optical emission spectrometry using a glow discharge tube equipped with an electrode having an end section, comprising:
    covering one end of a cylindrical sample holding section being open at both ends using a covering member;
    filling a powder sample containing a material to be analyzed into the sample holding section;
    compressing the powder sample by pressurizing the filled powder sample from the other end to the one end of the sample holding section;
    removing the covering member from the sample holding section, thereby producing the sample containing object which includes the sample holding section and the compressed powder sample and from which the compressed powder sample is exposed from the one end,
    mounting the sample containing object on the glow discharge tube so that the compressed powder sample contained in the sample containing object is opposed to the end section,
    reducing the pressure inside the glow discharge tube,
    generating glow discharge by applying a voltage between the electrode and the sample containing object, and
    performing glow discharge optical emission spectrometry.

9. The method according to claim 8, wherein
    the end section has a cylindrical shape, and
    the size of the compressed powder sample being exposed from the one end of the sample containing object is larger than the inside diameter of the end section.

10. A tool, to perform glow discharge optical emission spectrometry using a glow discharge tube equipped with an electrode having an end section, for producing a sample containing object that is to be disposed so as to be opposed to the end section, comprising:
    a sample holding section having a cylindrical shape and being open at both ends;
    a covering member for covering one end of the sample holding section;

a plate having a size not larger than the inside diameter of the sample holding section and being to be pressed against the powder sample filled into the sample holding section from the other end side; and a rod for pressurizing the powder sample by pressing the plate to the one end, thereby compressing the powder sample, wherein an outer shape size of the sample holding section at the one end is larger than an inside diameter of an opening end of a hole which is formed in the glow discharge tube and in which the end section is disposed.

11. The tool according to claim 10, further comprising a mounting table on which the sample holding section and the covering member are mounted with the one end side of the sample holding section facing downward, wherein a communicating hole communicating with the portion on which the sample holding section and the covering member are mounted is provided in the mounting table.

12. A glow discharge optical emission spectrometer, comprising:

a glow discharge tube equipped with an electrode having an end section;

a pressure reducing section configured to reduce the pressure inside of the glow discharge tube;

a pressing section for pressing a sample containing object which includes a sample holding section having a cylindrical shape and being open at both ends and a powder sample compressed inside the sample holding section and from which the powder sample is exposed from the one end of the sample holding section to the glow discharge tube so that the powder sample is opposed to the end section; and a power source section configured to generate glow discharge by applying a voltage between the electrode and the sample containing object.

\* \* \* \* \*